(12) United States Patent
Christin et al.

(10) Patent No.: US 9,722,733 B2
(45) Date of Patent: Aug. 1, 2017

(54) TRANSMISSION OF ACKNOWLEDGMENT OF SHORT DURATION

(71) Applicant: Orange, Paris (FR)

(72) Inventors: Philippe Christin, Rennes (FR); Laurent Cariou, Rennes (FR); Getachew Redieteab, Janze (FR)

(73) Assignee: ORANGE, Paris (FR)

( * ) Notice: Subject to any disclaimer, the term of this patent is extended or adjusted under 35 U.S.C. 154(b) by 397 days.

(21) Appl. No.: 14/369,482

(22) PCT Filed: Jan. 3, 2013

(86) PCT No.: PCT/FR2013/050004
§ 371 (c)(1),
(2) Date: Jun. 27, 2014

(87) PCT Pub. No.: WO2013/102730
PCT Pub. Date: Jul. 11, 2013

(65) Prior Publication Data
US 2014/0334505 A1    Nov. 13, 2014

(30) Foreign Application Priority Data

Jan. 4, 2012  (FR) ...................... 12 50080

(51) Int. Cl.
*H04L 1/00*   (2006.01)
*H04L 1/16*   (2006.01)
(Continued)

(52) U.S. Cl.
CPC .......... *H04L 1/1671* (2013.01); *H04L 1/1692* (2013.01); *H04L 1/1829* (2013.01); *H04L 7/0091* (2013.01); *H04L 7/10* (2013.01)

(58) Field of Classification Search
None
See application file for complete search history.

(56) References Cited

U.S. PATENT DOCUMENTS

| | | | |
|---|---|---|---|
| 2007/0223525 A1* | 9/2007 | Shah | H04W 72/02 370/468 |
| 2008/0045153 A1* | 2/2008 | Surineni | H04B 7/0417 455/63.1 |

(Continued)

FOREIGN PATENT DOCUMENTS

| | | |
|---|---|---|
| WO | 2008002972 A2 | 1/2008 |
| WO | 2008018693 A1 | 2/2008 |

OTHER PUBLICATIONS

International Preliminary Report on Patentability and English Translation of the Written Opinion dated Jul. 8, 2014 for corresponding International Patent Application No. PCT/FR2013/050004, filed Jan. 3, 2013.

(Continued)

*Primary Examiner* — Alex Skripnikov
(74) *Attorney, Agent, or Firm* — David D. Brush; Westman, Champlin & Koehler, P.A.

(57) ABSTRACT

A method is provided for sending an acknowledgement frame by a receiving entity. The method includes: subsequent to reception of a data frame sent by a sending entity and including a synchronization field containing an invariant item of information known to the entities and an identification field containing information identifying the sending entity and the receiving entity, sending an acknowledgment frame including a synchronization field; and calculating a signature of a transmission channel between the sending entity and the receiving entity, the synchronization field of the acknowledgment frame being obtained on the basis of the synchronization field of the data frame, by using the signature.

9 Claims, 4 Drawing Sheets

(51) Int. Cl.
*H04L 7/10* (2006.01)
*H04L 1/18* (2006.01)
*H04L 7/00* (2006.01)

(56) References Cited

U.S. PATENT DOCUMENTS

| | | | |
|---|---|---|---|
| 2009/0285240 A1 | 11/2009 | Zhang et al. | |
| 2010/0056069 A1* | 3/2010 | Toshimitsu | H04B 1/38 455/75 |
| 2011/0205968 A1 | 8/2011 | Kim et al. | |
| 2012/0155515 A1* | 6/2012 | Smith | H04L 25/03343 375/219 |
| 2014/0198739 A1* | 7/2014 | Kenney | H04L 1/08 370/329 |

OTHER PUBLICATIONS

International Search Report and Written Opinion dated Feb. 26, 2013 for corresponding International Patent Application No. PCT/FR2013/050004, filed Jan. 3, 2013.
French Search Report and Written Opinion dated Aug. 29, 2012 for corresponding French Patent Application No. 1250080, filed Jan. 4, 2012.
Haoming Li et al., "Multi-User Medium Access Control in Wireless Local Area Network", Wireless Communications and Networking Conference (WCNC), 2010 IEEE, IEEE, Piscataway, NJ, USA, Apr. 18, 2010 (Apr. 18, 2010), pp. 1-6, XP031706254.

* cited by examiner

TRANSMISSION OF ACKNOWLEDGMENT OF SHORT DURATION

CROSS-REFERENCE TO RELATED APPLICATIONS

This Application is a Section 371 National Stage Application of International Application No. PCT/FR2013/050004, filed Jan. 3, 2013, which is incorporated by reference in its entirety and published as WO 2013/102730 on Jul. 11, 2013, not in English.

1. FIELD OF THE INVENTION

The field of the invention is that of systems for communication between two entities using a radioelectric, electrical or optical transmission channel, and more particularly that of the acknowledgment by a terminal of a correctly received data frame.

2. STATE OF THE PRIOR ART

In wireless optical and power-line carrier radio communication systems, the transmission channel is a shared resource disturbed by interference between the various sending and receiving entities sharing the channel, and by collisions between the various data frames traveling in the channel. To enhance the reliability of exchanges, the data frames are acknowledged by the receiving entity by virtue of an acknowledgment frame intended for the sending entity, in case of correct reception.

Figure 1:
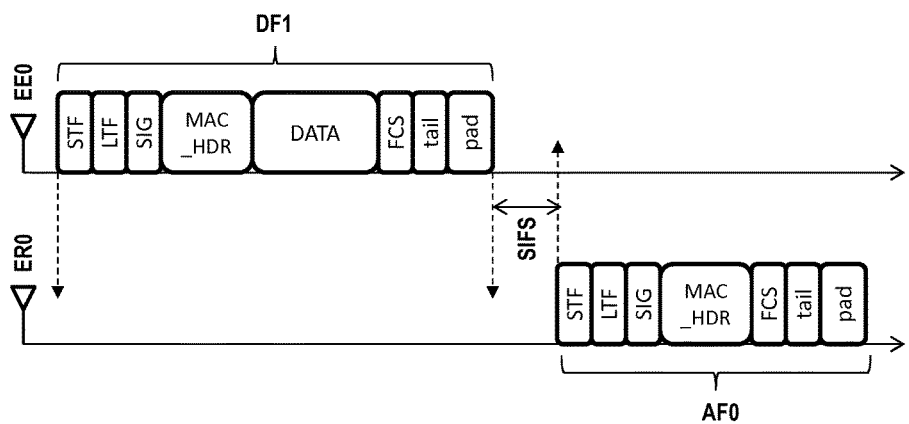

The data frames and the acknowledgment frames are of the same format. FIG. 1 illustrates the composition of a frame based on the example of the WiFi data and WiFi acknowledgment frames according to the IEEE 802.11 standard, respectively DF1 and AF0. Such a frame is composed of the following parts:
- a PLCP (Physical Layer Convergence Protocol) header, comprising the STF (Short Training Field), LTF (Long Training Field) and SIG (Signal Field) fields,
- a MAC (Medium Access Control) header with, inter alia, the source MAC address and destination MAC address fields, as well as a field indicating the type of the frame (DATA for a data frame or ACK for an acknowledgment frame),
- the MAC data, absent in the frames of ACK type,
- and other fields such as FCS (Frame Check Sequence), tail, pad (or padding).

The STF field is invariant and indicates the type of protocol used by the transmission, for example the IEEE 802.11a protocol. The LTF field serves in the case of frequency synchronization, and the SIG field serves in the case of OFDM (Orthogonal Frequency Division Multiplexing) transmission.

In the 7-layer OSI (Open Systems Interconnection) communication model, used by local networks according to the IEEE 802.11 standard, the PLCP sub-layer forms part of the physical layer, which is the first layer and the lowest. The MAC sub-layer forms part of the data link layer, which is the second layer of the model. Upon reception of a frame, the physical layer (PLCP sub-layer) of an entity firstly detects the type of frame with the aid of the STF field. If the type is the right one (WiFi), the physical layer demodulates the frame and uploads the result to the data link layer (MAC sub-layer). The data link layer verifies the integrity of the frame with the aid of the FCS field, and according to the result, it verifies moreover whether the frame is indeed intended for the entity, with the aid of the MAC header. The mechanism for generating the acknowledgment frame also requires interactions between the first two layers, physical and data link.

A data frame comprises a data part, of variable size ranging from about 100 bytes for Voice over Internet protocol, to several kilo-bytes for video. According to the IEEE 802.11a standard, the transmission of 100 bytes can take 40 µs, whereas that of a packet of 1500 bytes can take up to 2064 µs. The set of bytes making up the MAC part (header and data) is modulated at a bitrate which is optimized as a function of the conditions of the transmission channel.

Upon an acknowledgment, the MAC header alone, 20 bytes long, is modulated at a moderate bitrate to secure the transmission. According to the IEEE 802.11a standard, the occupancy of the transmission channel for this acknowledgment is of the order of 32 µs.

The more robust the modulation used, the longer will be the duration of transmission of the acknowledgment. The smaller its duration, the more the chances of losing the acknowledgment increase, thus resulting in retransmission of the initial data frame.

For low-bitrate traffic, that is to say involving short data frames, the acknowledgment frames represent a significant share of the traffic. Such is the case especially for Voice over IP traffic and for traffic between machines, where the bandwidth occupied by the acknowledgments can become a problem.

Patent application WO 2008/018693 discloses an acknowledgment frame of small duration, but does not solve the problem of the reliability of the assigning of this frame to the entity which sent it.

The receiving entity, when it performs an acknowledgment of the data received, must therefore effect a compromise between maximizing the reliability of the acknowledgment and minimizing the crowding of the transmission channel.

A need therefore exists for a solution not exhibiting these drawbacks.

3. DISCLOSURE OF THE INVENTION

The invention improves the situation with the aid of a method of sending of an acknowledgment frame by a receiving entity, comprising, subsequent to the reception of a data frame sent by a sending entity and comprising a synchronization field containing an invariant item of information known to said entities and an identification field containing information identifying said sending entity and said receiving entity, a step of sending by said receiving entity of an acknowledgment frame comprising a synchronization field. The method of sending of an acknowledgment frame furthermore comprises a step of calculating a signature of the transmission channel between the sending entity and the receiving entity, the synchronization field of the acknowledgment frame being obtained on the basis of the synchronization field of the data frame, by means of said signature.

This makes it possible to save calculation resources in the acknowledgment frame sending entity, to speed up the sending of the acknowledgment frame, and to decrease the crowding of the transmission channel caused by the acknowledgment frame. Indeed, in contradistinction to the prior art, no item of data coming into the composition of the acknowledgment frame is modulated, and the size of the acknowledgment frame is decreased.

The signature uniquely characterizes the transmission channel between the sending and receiving entities. Advantageously, the synchronization field thus signed allows the sending entity, recipient of the acknowledgment frame, to recognize the signature in an acknowledgment frame and not to confuse the frame with another acknowledgment frame intended for another sending entity.

According to one aspect of the method of sending an acknowledgment frame according to the invention, the synchronization field of the acknowledgment frame comprises the synchronization field of the data frame.

Advantageously, the synchronization field inserted into the acknowledgment frame by the receiving entity is simply identical to that which was generated by the sending entity, without particular differentiation in the transmission chain.

According to one aspect of the method of sending an acknowledgment frame according to the invention, the step of calculating the signature comprises a step of reversing the temporal response of said channel, recorded with the aid of the synchronization field of the data frame.

This allows particularly robust recognition of the signature by the entity for which the acknowledgment frame is intended, while preserving information on the identity of the entity sending the acknowledgment, in spite of the non-transmission of the identification field in the acknowledgment frame, and without increasing the crowding of the transmission channel.

The invention also relates to a method of sending of a data frame by a sending entity to a receiving entity, said data frame comprising a synchronization field containing an invariant item of information known to said entities and an identification field containing information identifying said sending entity and said receiving entity, the method comprising at least one step of sending said data frame, said sending step being repeated with a predetermined interval until the reception, in a predetermined time slot inside said interval, of an acknowledgment frame comprising a synchronization field obtained on the basis of the synchronization field of the data frame, by means of a signature of the transmission channel between the sending entity and the receiving entity.

In the prior art, the MAC header is transmitted in the acknowledgment frame so as to allow any entity of the network receiving an acknowledgment frame, including and especially third party entities, to identify which entities are concerned in the acknowledgment, and to avoid confusion between several acknowledgments intended for different entities. According to the invention, the entity sending the data frame, and then recipient of the acknowledgment frame, trusts a temporal synchronization between the sending of a data frame, the elapsing of an interval and the reception of an acknowledgment frame. If the acknowledgment frame arrives inside a precise time window inside said interval, this indicates that it is indeed the acknowledgment frame corresponding to the data frame. It is therefore not necessary, as in the prior art, to transmit the MAC header in an acknowledgment frame so that the entity sending the data frame recognizes the acknowledgment frame intended for it.

If the temporal synchronization does not allow an entity sending a data frame, and recipient of an acknowledgment frame, to determine with certainty that an acknowledgment frame received is indeed intended for it, the signature of the transmission channel advantageously eliminates any ambiguity.

According to one aspect of the method for sending a data frame according to the invention, the synchronization field of the acknowledgment frame comprises the synchronization field of the data frame. Advantageously, the synchronization field received by the sending entity in the acknowledgment frame is simply identical to that which it sent in the data frame, without particular processing.

According to one aspect of the invention, the method for sending a data frame furthermore comprises a step of correlating the synchronization field of the acknowledgment frame received with the synchronization field of the data frame, the repetition of the sending of the data frame being inhibited as a function of the result of this correlation.

When information sequences are received by the sending entity inside an expected time slot, it compares them with the information sequences formed by a synchronization field, and measures the dispersion of the result of the correlation. If this dispersion is low, that is to say if the result of the correlation corresponds to a very sharp spike, this signifies that the information sequences received correspond to the acknowledgment frame expected by the sending entity. This signifies that the data frame that it sent has been correctly received, and that it is no longer necessary to send it.

According to one aspect of the invention, the acknowledgment frame comprises solely a synchronization field. This is advantageous insofar as such an acknowledgment frame comprising solely a synchronization field is of much shorter duration than an acknowledgment frame according to the prior art. In WiFi for example, the occupancy of the transmission channel in respect of an acknowledgment according to the invention will be of the order of 8 µs, rather than 32 µs according to the prior art. The transmission channel is occupied for less time in respect of the acknowledgments, thereby leaving greater space for the data.

Moreover, as other fields come into the composition of an acknowledgment frame according to the prior art, it is possible for a sending entity for which an acknowledgment frame is intended to easily distinguish two types of acknowledgment, by short acknowledgment frame according to the invention, or by long acknowledgment frame according to the prior art. In a WiFi network for example, using both acknowledgment according to the invention and acknowledgment according to the prior art, the absence of the LTF and SIG fields, present in the PLCP header of a long acknowledgment frame according to the prior art, indicates to the recipient entity that the acknowledgment used is an acknowledgment by short acknowledgment frame. A prior announcement, through a negotiation between the entities concerned, may be necessary in the case of using both types of acknowledgments, long and short.

According to one aspect of the invention, the invariant item of information of the synchronization field comprises solely symbols arranged so as to temporally synchronize said entities. Advantageously, the synchronization field consists of sequences of symbols selected for their good differentiation (inter-correlation) and recognition (auto-correlation) properties. According to the IEEE 802.11 standard for example, the STF field, which makes it possible to identify that a frame is a WiFi frame, consists of ten identical sequences, each lasting a duration of 0.8 µs.

The invention also relates to a device for sending an acknowledgment frame by a receiving entity, comprising, subsequent to the reception of a data frame sent by a sending entity and comprising a synchronization field containing an invariant item of information known to said entities and an identification field containing information identifying said sending entity and said receiving entity, means of sending by said receiving entity of an acknowledgment frame comprising a synchronization field. The device for sending an acknowledgment frame furthermore comprises a processing unit able to calculate a signature of the transmission channel between the sending entity and the receiving entity, the synchronization field of the acknowledgment frame being obtained on the basis of the synchronization field of the data frame, by means of said signature.

The invention also relates to a device for sending a data frame by a sending entity to a receiving entity, said data frame comprising a synchronization field containing an invariant item of information known to said entities and an identification field containing information identifying said sending entity and said receiving entity, the device comprising means for sending said data frame, said sending being repeated after a predetermined interval until the reception, in a predetermined time slot inside said interval, of an acknowledgment frame comprising a synchronization field obtained on the basis of the synchronization field of the data frame, by means of a signature of the transmission channel between the sending entity and the receiving entity.

The invention also relates to a computer program comprising instructions for the implementation of the method of sending of an acknowledgment frame, when this method is executed by a processor. The invention relates finally to a computer program comprising instructions for the implementation of the method for sending a data frame, when this method is executed by a processor.

These programs, stored on a computer readable medium, can use any programming language, and be in the form of source code, object code, or of code intermediate between source code and object code, such as in a partially compiled form, or in any other desirable form.

The invention relates finally to an acknowledgment signal, sent by a receiving entity subsequent to the reception of a data frame sent by a sending entity, the data frame comprising a synchronization field containing an invariant item of information known to said entities and an identification field containing information identifying said sending entity and said receiving entity, the signal carrying an acknowledgment frame comprising a synchronization field obtained on the basis of the synchronization field of the data frame, by means of a signature of the transmission channel between the sending entity and the receiving entity.

With respect to the prior art, this signal according to the invention causes less crowding of the transmission channel since its size is reduced and, as its signature uniquely characterizes the transmission channel between the sending and receiving entities, it is not re-sent because of a doubt as regards the sending or receiving entity.

4. PRESENTATION OF THE FIGURES

Figure 2:
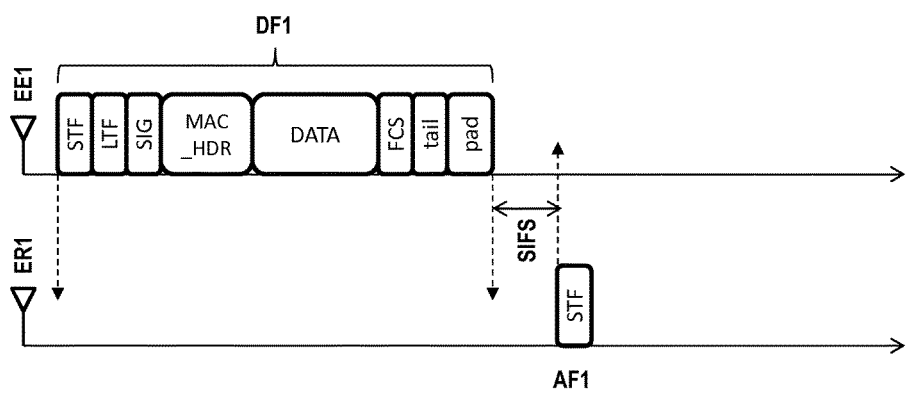
Figure 3:
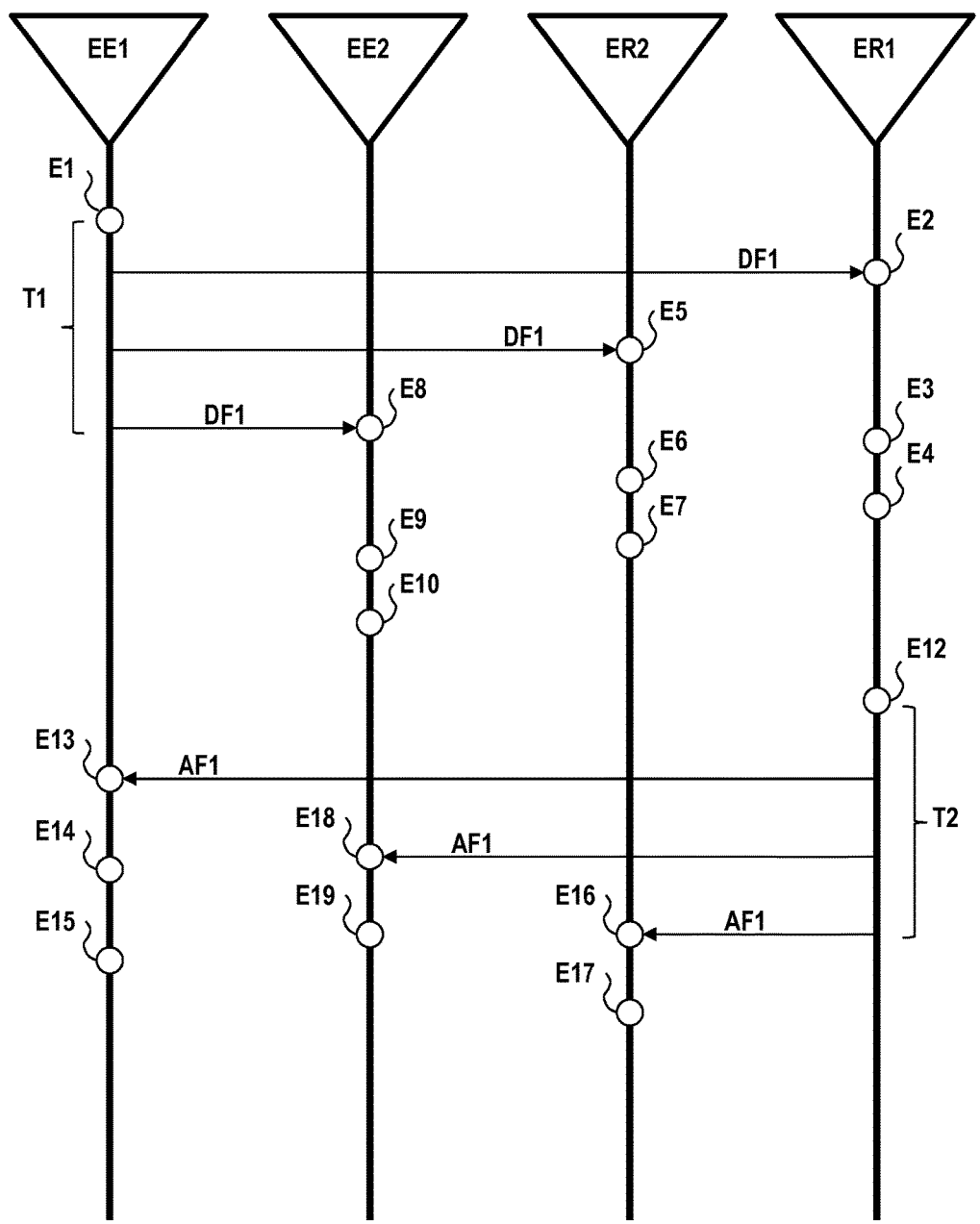
Figure 4:
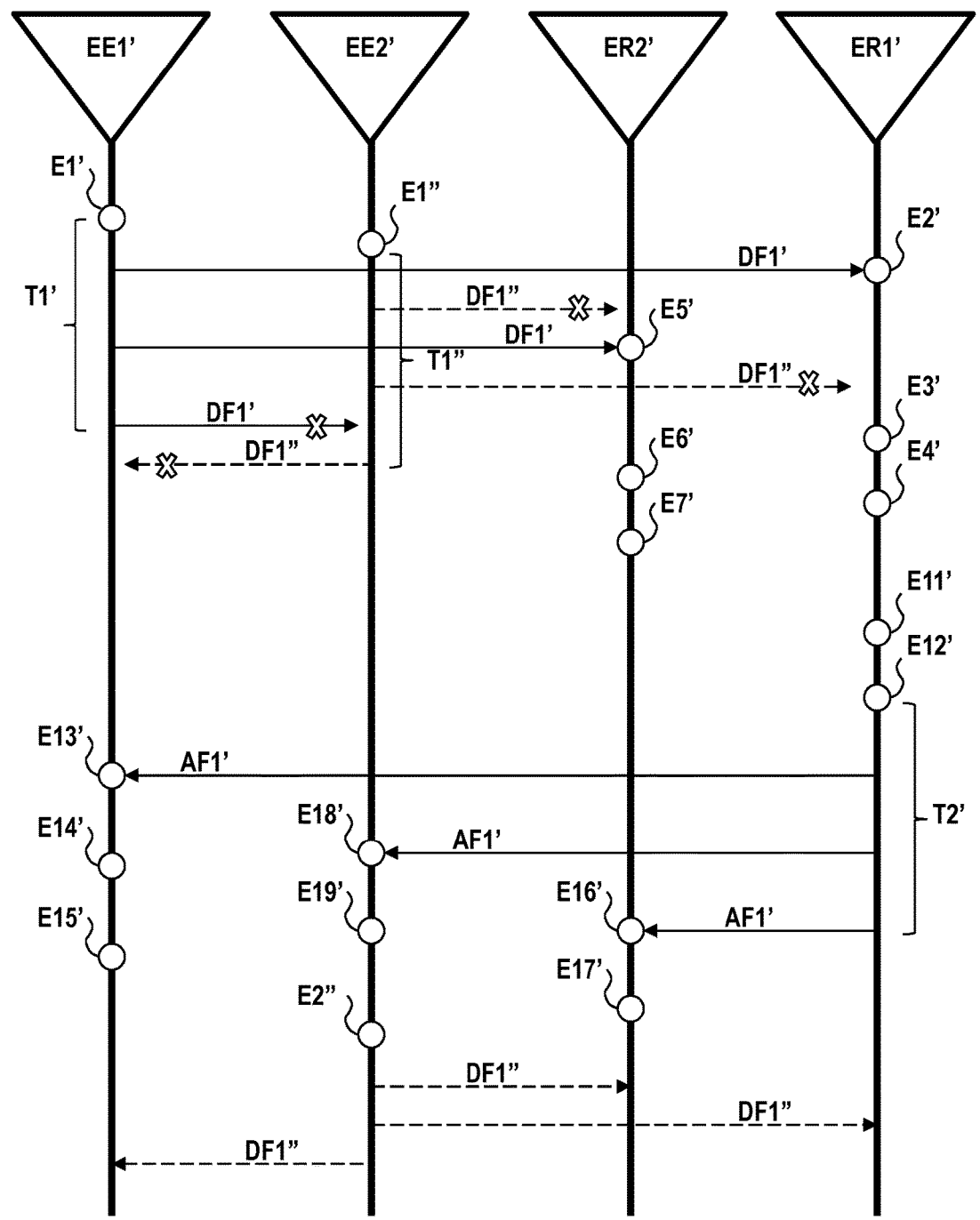
Figure 5:
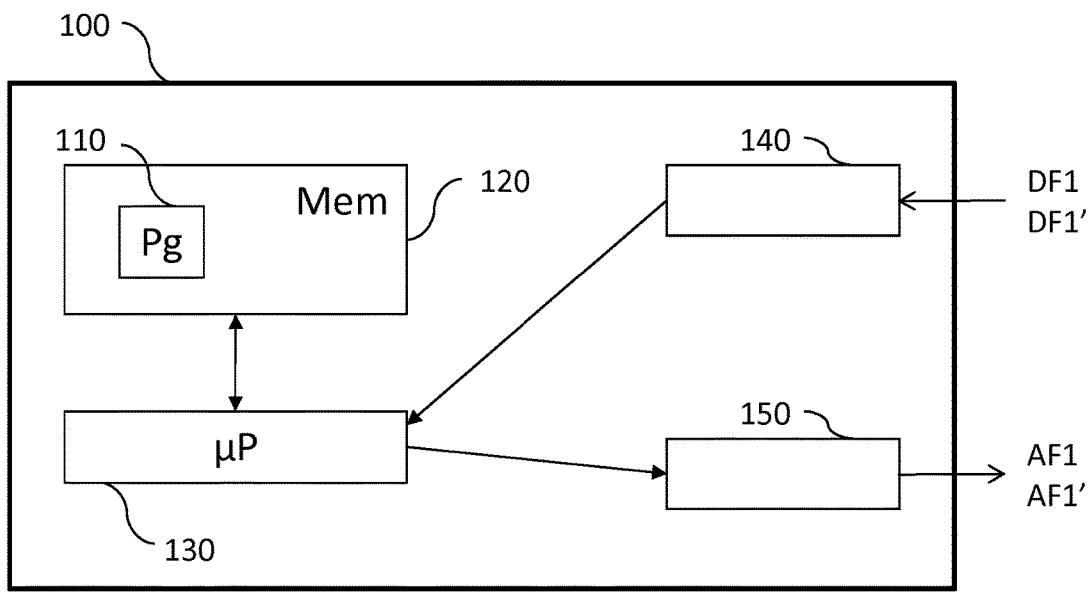
Figure 6:
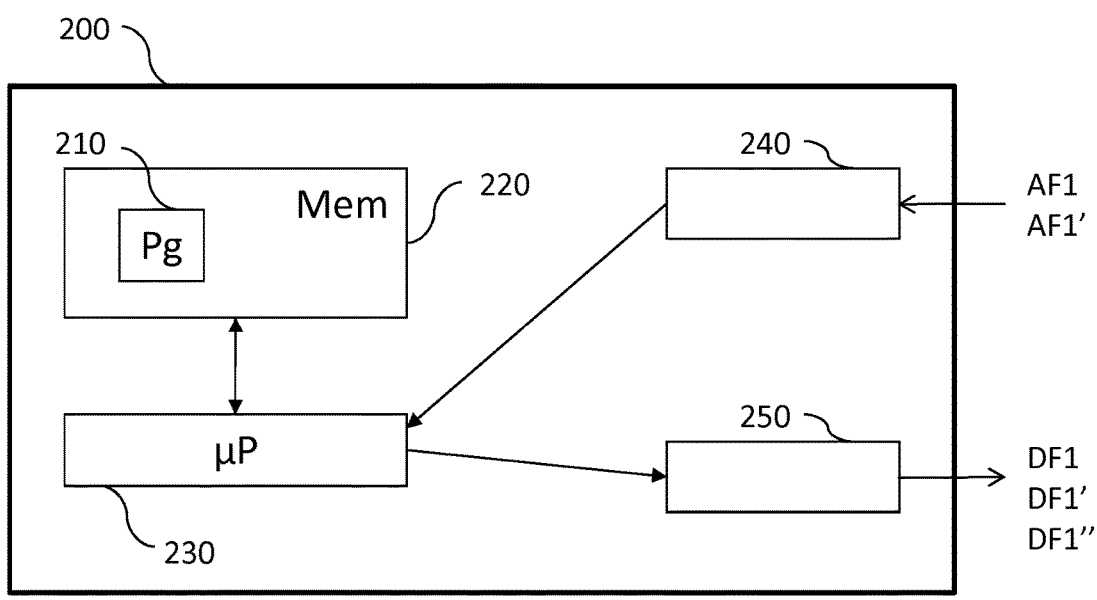

Other advantages and characteristics of the invention will become more clearly apparent on reading the following description of a particular embodiment of the invention, given by way of simple illustrative and nonlimiting example, and the appended drawings, among which:

FIG. 1 presents the structure of a data frame and the structure of an acknowledgment frame according to the prior art, FIG. 2 presents the structure of a data frame and the structure of an acknowledgment frame according to an embodiment of the invention, FIG. 3 presents the steps of the methods for sending a data frame and for sending an acknowledgment frame according to a first embodiment of the invention, FIG. 4 presents the steps of the methods for sending a data frame and for sending an acknowledgment frame according to a second embodiment of the invention, FIG. 5 presents the structure of a device sending an acknowledgment frame, according to the invention, and FIG. 6 presents the structure of a device sending a data frame, according to the invention.

5. DETAILED DESCRIPTION OF AT LEAST ONE EMBODIMENT OF THE INVENTION

Considered in the subsequent description is the case of two embodiments of the invention by entities communicating with one another by WiFi, that is to say by a transmission channel according to the IEEE 802.11 standard. The invention is not limited to this case, and applies to other types of transmission channels such as power-line carrier (IEEE standard 1901), or wireless optical (IEEE standard 802.15.7).

The structure of a data frame DF1 sent by a sending entity EE0 and the structure of an acknowledgment frame AF0 sent by a receiving entity ER0, according to the prior art, were presented above with reference to FIG. 1.

FIG. 2 presents the structure of a data frame and the structure of an acknowledgment frame, according to an embodiment of the invention. A sending entity EE1 sends a data frame DF1 which remains unchanged with respect to the prior art. A receiving entity ER1 sends an acknowledgment frame after an interval SIFS counted from the end of the reception of the data frame DF1. The interval SIFS (Short Inter-Frame Sequence) makes it possible to leave, the entities concerned in the transmission, time to pass from the sending mode to the reception mode (and vice versa).

The acknowledgment frame which is sent according to the invention, in contradistinction to the prior art, is an acknowledgment frame AF1 which comprises a synchronization field based on the STF field of the data frame DF1, but does not comprise certain, or indeed all, of the other fields of this data frame DF1, and in particular does not comprise any identification field containing information identifying the sending entity EE1 and the receiving entity ER1, such as a MAC header.

Thus, the acknowledgment frame AF1 can comprise the STF field of the data frame DF1, but does not comprise any field comprising modulated data, especially the MAC header of this data frame, thereby making it possible to decrease the size of the acknowledgment frame while maintaining its functionality.

In particular, in the particular embodiment illustrated in FIG. 2, the acknowledgment frame AF1 is an acknowledgment frame AF1 composed solely of the STF field, for example generated locally at the level of the receiving entity ER1, of the data frame DF1.

FIG. 3 presents the steps of the methods for sending a data frame and for sending an acknowledgment frame according to a first embodiment of the invention. In the example illustrated by this figure, the entities EE1, EE2, ER1 and ER2 each send WiFi frames which are all received and demodulated by all the entities, even if they are not all intended for them.

More precisely, the frames dispatched by the entities EE1 and EE2 are intended respectively for the entities ER1 and ER2, and the frames dispatched by the entities ER1 and ER2 are intended respectively for the entities EE1 and EE2.

During a step E1, the entity EE1 sends at a moment T1 a data frame DF1 intended for the entity ER1. The MAC header of the frame DF1 contains the identifier of the sending entity, EE1, and the identifier of the receiving entity, ER1.

During a step E2, the entity ER1 receives the data frame DF1 at the level of its physical layer. The physical layer recognizes by virtue of the STF field placed first that it is dealing with a WiFi frame, demodulates the frame DF1, and then uploads the result to the data link layer.

During a step E3, the data link layer verifies the integrity of the data with the aid of the FCS field.

During a step E4, the data link layer verifies with the aid of the MAC header that the frame DF1 is indeed intended for the entity ER1.

According to the first embodiment of the invention, when the verifications of steps E3 and E4 are positive, the data link layer of the entity ER1 instructs the physical layer to send, at a moment T2 during a step E12, an acknowledgment frame AF1 consisting solely of the synchronization field, that is to say of the STF field. In contradistinction to the prior art, the physical layer does not use any data modulated by the data link layer, such as the MAC header, to construct the acknowledgment frame. A modulation operation is therefore not necessary in respect of the sending of the acknowledgment frame, thus making it possible to speed up the sending and to save calculation resources in the entity sending the acknowledgment frame.

Moreover, once the instruction to send an acknowledgment frame has been received from the data link layer, the STF synchronization field alone is required by the physical layer in order to construct its acknowledgment frame. As this field is invariant and known to the physical layer, it is not necessary for the data link layer to transmit it to the physical layer.

If one of the verifications of steps E3 or E4 is negative, the data link layer of the entity ER1 ignores the data of the DATA field and does not instruct the physical layer to send an acknowledgment frame. In this case, the entity EE1, sending the frame DF1, not receiving any acknowledgment frame inside a predetermined interval, will resend the frame DF1 during a subsequent step, not described.

The entity ER1 is not the only entity to receive the sent frame DF1 at the instant T1 during step E1.

During a step E5, the entity ER2 also receives the data frame DF1 at the level of its physical layer. The physical layer recognizes by virtue of the STF field placed first that it is dealing with a WiFi frame, demodulates the frame DF1, and then uploads the result to the data link layer.

During a step E6, the data link layer verifies the integrity of the data with the aid of the FCS field.

During a step E7, the data link layer determines with the aid of the MAC header that the frame DF1 is not intended for the entity ER2, and ignores it.

During a step E8, the entity EE2 also receives the data frame DF1 at the level of its physical layer. The physical layer recognizes by virtue of the STF field placed first that it is dealing with a WiFi frame, demodulates the frame DF1, and then uploads the result to the data link layer.

During a step E9, the data link layer verifies the integrity of the data with the aid of the FCS field.

During a step E10, the data link layer determines with the aid of the MAC header that the frame DF1 is not intended for the entity EE2, and ignores it.

Subsequent to step E12, during a step E13, the entity EE1 receives the acknowledgment frame AF1 at the level of its physical layer. On the basis of the interval elapsed between step E1 and step E13, the entity EE1 knows that it is on standby awaiting an acknowledgment frame comprising an STF field.

During a step E14, the entity EE1 calculates a score for the correlation between the information sequence received and the sequence expected. If this score exceeds a predetermined threshold, the entity EE1 determines that the frame AF1 received is indeed the frame AF1 intended for it since it does indeed correspond to an acknowledgment, by the entity ER1, of the data frame DF1.

The entity EE1 therefore decides, during a step E15, not to resend the data frame DF1.

The entity EE1 is not the only entity to receive the frame AF1 sent at the instant T2 during step E12.

During a step E16, the entity ER2 also receives the acknowledgment frame AF1 at the level of its physical layer. The physical layer recognizes by virtue of the STF field placed first that it is dealing with a WiFi frame. As no other item of information follows the STF field in the frame AF1, the entity ER2 deduces therefrom that it is dealing with an acknowledgment frame.

As the entity ER2 is not on standby awaiting an acknowledgment frame in a following predetermined time slot T2, it determines, during a step E17, that the frame AF1 is not intended for it, and ignores it.

During a step E18, the entity EE2 also receives the acknowledgment frame AF1 at the level of its physical layer. The physical layer recognizes by virtue of the STF field placed first that it is dealing with a WiFi frame. As no other item of information follows the STF field in the frame AF1, the entity EE2 deduces therefrom that it is dealing with an acknowledgment frame.

As the entity EE2 is not on standby awaiting an acknowledgment frame in a following predetermined time slot T2, it determines, during a step E19, that the frame AF1 is not intended for it, and ignores it.

During steps E14, E17 and E19, respectively the entities EE1, ER2 and EE2 can determine whether or not the acknowledgment frame AF1 is intended for them by virtue of transmission channel occupancy rules specific to the standard used, such as the IEEE 802.11 standard in our example. These rules prevent several entities from sending frames simultaneously or too closely together, by imposing on the entities visible from one another, such as EE1, EE2, ER1 and ER2, intervals to be complied with between the detection and the sending of a frame, which intervals are specific to the types of frames and which are calculated so as to avoid collisions between frames. A collision is defined here by the reception, by a sending entity, of an acknowledgment frame which is not intended for it, inside an expected time slot.

Despite the transmission channel occupancy rules, cases exist where collisions of frames occur. Such a case is illustrated with reference to FIG. 4.

FIG. 4 presents the steps of the methods for sending a data frame and for sending an acknowledgment frame according to a second embodiment of the invention. In the example illustrated by this figure, the entities EE1', EE2', ER1' and ER2' each send WiFi frames which are all received by all the entities, even if they are not all intended for them.

More precisely, the frames dispatched by the entities EE1' and EE2' are intended respectively for the entities ER1' and ER2', and the frames dispatched by the entities ER1' and ER2' are intended respectively for the entities EE1' and EE2'.

During a step E1', the entity EE1' sends at a moment T1' a data frame DF1' intended for the entity ER1'. The MAC header of the frame DF1' contains the identifier of the sending entity, EE1', and the identifier of the receiving entity, ER1'.

During a step E2', the entity ER1' receives the data frame DF1' at the level of its physical layer. The physical layer recognizes by virtue of the STF field placed first that it is dealing with a WiFi frame, demodulates the frame DF1', and then uploads the result to the data link layer.

During a step E3', the data link layer verifies the integrity of the data with the aid of the FCS field.

During a step E4', the data link layer verifies with the aid of the MAC header that the frame DF1' is indeed intended for the entity ER1'.

When the verifications of steps E3' and E4' are positive, the data link layer of the entity ER1' instructs the physical layer to send, at a moment T2' during a step E12', an acknowledgment frame AF1' consisting of an item of information based on the synchronization field, that is to say the STF field.

According to the second embodiment of the invention, the item of information constituting the acknowledgment frame AF1', based on the STF field, comprises a signature of the transmission channel between the entities EE1' and ER1'. This unique signature allows the entity EE1', when it receives the frame AF1' during a step E13', to determine with certainty that it is indeed intended for it. Likewise, the signature allows the entity EE2', when it receives the frame AF1' during a step E18', to determine with certainty that it is not intended for it.

This signature of the transmission channel between the sending entity EE1' and the receiving entity ER1' is calculated during a step E11', before the transmission of the acknowledgment frame of step E12', so as to obtain the synchronization field of the acknowledgment frame AF1' on the basis of the synchronization field of the data frame DF1', by means of this signature.

In particular, the signature can be a reversal of the temporal response, recorded with the aid of the STF field, of the transmission channel between the entities EE1' and ER1'.

The temporal response of the channel for an item of information received is defined as the set of detections of this item of information at the reception point. This set results from the plurality of paths taken simultaneously by the item of information, from the sender to the receiver of the item of information. These paths differ in length, and depend on parameters such as the location, the shape and the texture of the obstacles disposed between the sender and the receiver. As the paths differ in length, the detections on arrival are spread over several instants. As the paths also differ in attenuation power, the detections on arrival differ in energy. This set of detections is recorded by the receiving entity ER1', using the STF synchronization field of the data frame DF1'. By virtue of the recording of the set of detections, the entity ER1' is able to return the detections with the same energy, but inverting their chronological order. This is what defines the temporal reversal of the temporal response.

Advantageously, when, during step E13', the entity EE1' receives from the entity ER1' the acknowledgment frame AF1' signed with the aid of this temporal reversal technique, the resulting disturbances of the physical characteristics of the transmission channel between the entities ER1' and EE1' are canceled at the point where the entity EE1' is situated. For the entity EE1', not only is the detection now unique rather than multiple, but it is also of strong intensity, therefore robust, since the whole of the energy of the signal is now concentrated in a single detection rather than dispersed in several detections.

As in the first embodiment, the physical layer does not use any data modulated or transmitted by the data link layer to construct the acknowledgment frame.

If one of the verifications of steps E3' or E4' is negative, the data link layer of the entity ER1' ignores the data of the DATA field and does not instruct the physical layer to send an acknowledgment frame. In this case, the entity EE1', sending the frame DF1', not receiving any corresponding acknowledgment frame inside a predetermined interval, will resend the frame DF1' during a subsequent step, not described.

The entity ER1' is not the only entity to receive the frame DF1' sent at the instant T1' during step E1'.

During a step E5' the entity ER2' also receives the data frame DF1' at the level of its physical layer. The physical layer recognizes by virtue of the STF field placed first that it is dealing with a WiFi frame, demodulates the frame DF1', and then uploads the result to the data link layer.

During a step E6', the data link layer verifies the integrity of the data with the aid of the FCS field.

During a step E7', the data link layer determines with the aid of the MAC header that the frame DF1' is not intended for the entity ER2', and ignores it.

During a time slot comprising the moment T1', the entity EE2' is hidden from the other entities, for example by a physical obstacle temporarily blocking the transmission channels of the entity EE2', which does not receive the data frame DF1' sent by the entity EE1'.

During the same time slot, at a moment T1" close to the moment T1', the entity EE2' sends, during a step E1", a data frame DF1". Because of the temporary obstacle, this frame DF1" is not received by any of the other entities. In particular, the frame DF1" is not received by the entity ER2' for which it is intended.

Subsequent to step E12', during step E13', the entity EE1' receives the acknowledgment frame AF1' at the level of its physical layer. On the basis of the interval elapsed between step E1' and step E13', the entity EE1' knows that it is on standby awaiting an acknowledgment frame comprising an STF field.

During a step E14', the entity EE1' calculates a score for the correlation between the information sequence received and the sequence expected. If this score exceeds a predetermined threshold, the entity EE1' determines that the frame received is indeed the frame AF1' intended for it since it does indeed correspond to an acknowledgment, by the entity ER1', of the data frame DF1'. By virtue of the signature of the transmission channel between the entities EE1' and ER1' present in the frame AF1', specific to this second embodiment of the invention, the correlation score is increased and the detection of the frame AF1' facilitated.

The entity EE1' therefore decides, during a step E15', not to resend the data frame DF1'.

The entity EE1' is not the only entity to receive the frame AF1' sent at the instant T2' during step E12'.

During a step E16', the entity ER2' also receives the acknowledgment frame AF1' at the level of its physical layer. The physical layer recognizes by virtue of the STF field placed first that it is dealing with a WiFi frame. As no other item of information follows the STF field in the frame AF1', the entity ER2' deduces therefrom that it is dealing with an acknowledgment frame.

As the entity ER2' did not send any data frame at an instant near to the instant T1', it determines, during a step E17', that the frame AF1' is not intended for it, and ignores it.

At the moment T2' preceding a step E18', the obstacle present during steps E1' and E1" has disappeared. During this step E18', the entity EE2' therefore also receives the acknowledgment frame AF1' at the level of its physical layer. On the basis of the interval elapsed between step E1" and step E18', the entity EE2' is on standby awaiting an acknowledgment frame composed of an STF field, since it sent a data frame DF1" at the instant T1" but does not know that the frame DF1" was never received by the entity ER2'.

During a step E19', the entity EE2' therefore calculates a score for the correlation between the expected information sequence and the sequence received. By virtue of the signature of the transmission channel between the entities EE1' and ER1' present in the frame AF1', specific to this second embodiment of the invention, the correlation score is decreased for the entities other than EE1', in particular for the entity EE2' where this score does not attain a predetermined threshold.

The entity EE2' therefore determines that the acknowledgment frame AF1' is not intended for it, that is to say the frame AF1' does not correspond to an acknowledgment, by the entity ER2', of the data frame DF1".

The entity EE2' therefore decides, during a step E2", to resend the data frame DF1".

The structure of a sender device sending an acknowledgment frame according to the invention, such a sender device being able to correspond or be included in the receiving entities ER1, ER2, ER1' or ER2' described previously, is now presented in conjunction with FIG. 5.

Such a sender device 100 comprises:
- a reception module 140, able to receive a data frame (DF1, DF1'),
- a sending module 150, able to send an acknowledgment frame (AF1, AF1').

The data and acknowledgment frames are processed by a processing unit 130 equipped with a microprocessor able to implement the constituent means of the invention such as were described previously, in particular, according to an aspect of the invention, means for recording a temporal response of the STF field included in a data frame, specific to the transmission channel, and means of temporal reversal of the STF field based on the recording of its temporal response.

The sender device 100 according to the invention furthermore comprises a memory 120 in which is stored a computer program 110 implementing the steps of the method for sending an acknowledgment frame. Upon initialization, the code instructions of the computer program 110 are for example loaded into a RAM memory, before being executed by the processor of the processing unit 130.

The structure of a sender device sending a data frame, according to the invention, such a sender device being able to correspond or be included in the sending entities EE1, EE2, EE1' or EE2' described previously, is now presented in conjunction with FIG. 6.

This sender device 200 comprises:
- a reception module 240, able to receive an acknowledgment frame (AF1, AF1'),
- a sending module 250, able to send a data frame (DF1, DF1', DF1").

The data and acknowledgment frames are processed by a processing unit 230 equipped with a microprocessor able to implement the constituent means of the invention such as were described previously, in particular, means of correlation between a frame received and the STF field.

The sender device 200 according to the invention furthermore comprises a memory 220 in which is stored a computer program 210 implementing the steps of the method for sending a data frame. Upon initialization, the code instructions of the computer program 210 are for example loaded into a RAM memory, before being executed by the processor of the processing unit 230.

The exemplary embodiments of the invention which have just been presented are merely a few of the conceivable embodiments. They show that the invention makes it possible to very greatly reduce the duration of the acknowledgments and the space that they take up in a transmission channel between sending and receiving entities, while rendering their detection, by the entities for which they are intended, easier and more robust.

The invention claimed is:

1. A method of sending an acknowledgment frame by a receiving entity, the method comprising:
    subsequent to reception of a data frame sent by a sending entity and comprising a synchronization field containing an invariant item of information known to said entities and an identification field containing information identifying said sending entity and said receiving entity:
    recording a temporal response of a transmission channel between the sending entity and the receiving entity, using the synchronization field of the received data frame,
    reversing the temporal response,
    sending an acknowledgement frame comprising solely the reversed temporal response, and not comprising data modulated by the receiving entity.

2. The method of sending of an acknowledgment frame as claimed in claim 1, wherein the synchronization field of the acknowledgment frame comprises the synchronization field of the data frame.

3. The method of sending as claimed in claim 1, wherein the acknowledgment frame comprises solely the synchronization field.

4. The method of sending as claimed in claim 1, characterized in that the invariant item of information of the synchronization field comprises solely symbols arranged so as to temporally synchronize said entities.

5. A method comprising:
    sending a data frame by a sending entity to a receiving entity, the data frame comprising a synchronization field containing an invariant item of information known to said entities and an identification field containing information identifying said sending entity and said receiving entity;
    repeating the sending of the data frame after a predetermined interval until reception, in a predetermined time slot inside said interval, of an acknowledgment frame comprising a synchronization field obtained on the basis of the synchronization field of the data frame, by using a signature of a transmission channel between the sending entity and the receiving entity; and
    correlating the synchronization field of the acknowledgment frame received with the synchronization field of the data frame, the repetition of the sending of said data frame being inhibited as a function of the result of this correlation.

6. The method of sending of a data frame as claimed in claim 5, wherein the synchronization field of the acknowledgment frame comprises the synchronization field of the data frame.

7. The method of sending as claimed in claim 5, wherein the invariant item of information of the synchronization field comprises solely symbols arranged so as to temporally synchronize said entities.

8. A device for sending an acknowledgment frame, comprised in a receiving entity, comprising:
   a sending module configured to send an acknowledgment frame, subsequent to the reception of a data frame sent by a sending entity and comprising a synchronization field containing an invariant item of information, known to the receiving entity and to the sending entity, and an identification field containing information identifying said receiving entity and said sending entity, and
   a processing unit configured to record the temporal response of a transmission channel between the sending entity and the receiving entity, using the synchronization filed of the received data frame, reversing the temporal response, the sent acknowledgement frame comprising solely the reversed temporal response, and not comprising data modulated by the receiving entity.

9. A device for sending a data frame, comprised in a sending entity, comprising:
   a receiving module configured to receive an acknowledgement frame; and
   a sending module configured to send a data frame comprising a synchronization field containing an invariant item of information known to the sending entity and to a receiving entity and an identification field containing information identifying said sending entity and said receiving entity, wherein the sending module is configured to repeat the sending of said data frame, after a predetermined interval, until reception by the receiving module, in a predetermined time slot inside said interval, of the acknowledgment frame, which comprises a synchronization field obtained on the basis of the synchronization field of the data frame, by using a signature of the transmission channel between the sending entity and the receiving entity, the sending module being also configured to correlate the synchronization field of the acknowledgment frame received with the synchronization field of the data frame, the repetition of the sending of said data frame being inhibited as a function of the result of this correlation.

* * * * *